Sept. 30, 1969 E. B. ZIMMER 3,469,390

SELF-CORRECTING CLOCK SYSTEM

Filed Dec. 19, 1966

INVENTOR

Ernest B. Zimmer

BY

Wood, Herron & Evans

ATTORNEYS 3,469,390
SELF-CORRECTING CLOCK SYSTEM

Ernest B. Zimmer, Cincinnati, Ohio, assignor to Cincinnati Time Recorder Co., Cincinnati, Ohio, a corporation of Ohio Filed Dec. 19, 1966, Ser. No. 602,746
Int. Cl. G04c *13/04*
U.S. Cl. 58—34 15 Claims

ABSTRACT OF THE DISCLOSURE

A clock system including a master clock with its own timekeeping mechanism; a plurality of remotely located secondary clocks having a pulse-responsive mechanism for displaying the time; and control means associated with the master clock for producing pulses at the rate of one pulse per minute for transmission to the secondary clock mechanism for advancing the secondary clock to display the proper time, and for generating correction pulses at a significantly higher repetition rate for transmission to the secondary clocks to cause the pulse-responsive mechanisms thereof to advance the secondary clocks at a rapid rate to bring them into synchronism with the master clock should the secondary clocks be displaying the wrong time.

This invention relates to clock systems in which a master clock controls a plurality of remotely located secondary clocks, and more particularly to master-secondary clock systems having automatically operable correction means for periodically synchronizing the secondary clocks with the master clock so that all the system clocks display the same time.

Clock systems of the type in which this invention finds particular, although not exclusive, utility generally include an independent master clock centrally located in some convenient place in the building where the system is in use and a number of dependent secondary clocks scattered throughout the building. In a typical installation, such as in a school, the master clock is located in the administrative office of the school and the secondary clocks are scattered among the various classrooms, cafeterias, auditoriums, and halls.

The independent master clock, considered in more detail, is a self-contained unit which has its own time-keeping mechanism, such as a synchronous motor driven chronometer, for providing a very precise indication of the time. In addition, the master clock includes a signal generator triggered by the time-keeping mechanism which is adapted to produce pulses, generally at a rate of one pulse per minute, for transmission to, and control of, the secondary clocks.

The secondary clocks, unlike the master clock, do not have their own time-keeping mechanism, and therefore, are not capable of independently displaying the proper time. However, the secondary clocks do contain a mechanism which is responsive to the periodic minute pulses transmitted by the master clock. This secondary clock mechanism is operative to increment the hands of the secondary clock in synchronism with those of the master clock as a consequence of the receipt of minute pulses from the master clock.

Under ideal conditions, the master clock and the secondary clocks, once synchronized, remain synchronized with the same time being displayed by all the clocks in the system. However, such ideal conditions do not always exist in practice with the result that frequently one or more of the secondary clocks get out of synchronism with the master clock. Consequently, it has been found necessary to include, in practical master-secondary clock systems, correction means for automatically and periodically attempting to produce a state of synchronism between the master clock and the secondary clocks.

The correction means frequently proposed for use in the prior art clock systems have taken a variety of forms and have had varying degrees of correction capability. For example, one proposed prior art scheme of which applicant is aware can correct only the minute hands of incorrect secondary clocks, and then can do so only at the expense of adding an additional wire between the master and secondary clocks whose sole function is a transmitting medium for correction signals. And, even with this proposal, there is only a limited minute hand correction capability, that is, the correction means can only correct minute hands up to twenty minutes slow and ten minutes fast.

The disadvantages of the above system are somewhat obviated in another more refined proposal of the prior art. In this refined proposal, the range of slow and fast minute hand corrections is extended, and the extra wire connecting the master and secondary clocks is eliminated. However, there is still no capability for correcting the hour hand, and consequently secondary clocks more than one hour fast or slow are not automatically corrected.

In still another clock system with which applicant is familiar, the disadvantage present in the above system, namely, no hour hand correction, is eliminated. However, in this proposal, like in the other prior art proposals, remedying the problem has not been without the introduction of another problem. In this particular system, hour hand correction capability is provided, but at the cost of losing the ability to correct fast minute hands.

A principal objective of this invention has been, therefore, to provide a master-secondary clock system capable of providing both hour hand correction and a full range of fast and slow minute hand correction, and further to provide such correction capability without the introduction of an additional wire for transmitting correction signals. In accordance with the principles of the present invention, this objective is accomplished by utilizing a very novel and unobvious concept in the design of the master and secondary clocks. This concept, more specifically, includes the provision of a master clock having a correction cycle during which time the polarity of the minute pulses normally employed to increment the secondary clocks is reversed and an additional train of rapid correction pulses of normal polarity is transmitted and of secondary clocks which, if not on time during the correction cycle, respond to the normal polarity correction pulses and which, if on time, respond only to the reverse polarity minute pulses. In operation, the reverse polarity minute pulses are effective to maintain correct clocks on time, while the normal polarity correction pulses are effective to rapidly increment only the incorrect clocks.

More particularly, a preferred embodiment of the master clock includes a minute pulse generator operative once each minute for producing minute pulses of a first, or normal, polarity. These normal polarity minute pulses are transmitted to the secondary clocks during the major portion of each hour advancing the secondary clocks on a minute-by-minute basis. The master clock further includes a correction pulse generator operable once per hour for approximately a one and one-half minute period which, as termed herein, is the hourly correction period. The correction pulse generator produces and transmits to the secondary clocks a train of rapid pulses of the same polarity as the minute pulses. These rapid pulses, herein termed correction pulses, are effective once each hour to increment the minute hands of incorrect secondary clocks until they are in synchronism with the minute hand of the master clock. Further comprising the master clock is a polarity reversing means which is operative during the hourly correction period to reverse the polarity of the minute pulses so that secondary clocks which, because they are unresponsive to normal polarity pulses if they are on time during the hourly correction period, may be maintained on time.

The secondary clocks each include an incrementing mechanism which is responsive to pulses of either normal or reverse polarity for advancing the minute hands at the rate of one minute per pulse and the hour hands at the rate of one hour per sixty pulses. The secondary clocks further include a selectively operable circuit for blocking normal polarity minute and correction pulses when the secondary clock displays a time coinciding with the beginning of the hourly correction period.

In operation, during the major portion of the hour the normal polarity minute pulses function to advance the minute hands of the secondary clocks at the rate of one minute per pulse. When the master clock reaches the point in time when the hourly correction period begins, the correction pulse generator begins operation generating rapid correction pulses of normal polarity and the polarity reversing means is triggered to reverse the polarity of the minute pulses. Those secondary clocks which are on time are not responsive to the normal polarity correction pulses because their normal polarity pulse blocking circuit is triggered when they display a time corresponding to the start of the hourly correction period. Hence, the clocks which are on time are not advanced by the normal polarity correction pulses. However, they are advanced by the reverse polarity minute pulses which are received during the hourly correction period and, consequently, are maintained in synchronism with the master clocks. Those clocks which are not on time are still responsive to normal polarity pulses since their blocking circuits have not yet triggered and, therefore, are rapidly incremented in response to the normal polarity correction pulses until their minute hands are coincident with the master clock minute hand. When this occurs the blocking circuits of the now synchronized secondary clocks are triggered, rendering the clocks no longer sensitive to further normal polarity pulses and further correction does not occur. All the secondary clocks now advance together each minute in response to the reverse polarity minute pulses. At some convenient time after the normal polarity correction pulses terminate, the pulse blocking circuits return to their normal unblocking condition at which time the polarity reversing means can be returned to its normal condition and the secondary clocks advanced in response to the normal polarity minute pulses until the start of the next hourly correction period.

To provide for correction of the hour hand, the master clock is additionally provided with means for actuating the correction pulse generator once every twelve hours for an extended period, termed herein the twelve hour correction period, and with means for actuating the polarity reversing means once every twelve hour period for a period including the twelve hour correction period. In addition, the secondary clocks include means for triggering the blocking circuit once every twelve hours starting when the secondary clock displays a time prior to the time at which the twelve hour correction period starts and exceeding in duration the twelve hour correction period.

In operation, clocks which are not on time during the twelve hour correction period have not had their blocking circuit triggered and, therefore, are responsive to the negative correction pulses generated during the twelve hour correction period. Consequently, they are incremented until they display a time coinciding with the point at which the pulse blocking circuit is triggered. At this time the secondary clock is no longer responsive to the twelve hour correction pulses. However, the secondary clock is not necessarily synchronized with the master clock. If it is synchronized, it is maintained in synchronism with the reverse polarity minute pulses which are being generated by the master clock. If it is not yet synchronized, it becomes so during the hourly correction period which follows, and once synchronized is maintained so by the positive minute pulses.

The secondary clocks which are synchronized with the master clock at the start of the twelve hour correction period are maintained in synchronism throughout the twelve hour correction period by the positive pulses generated by the master clock which are not blocked by the triggered secondary clock blocking circuit.

These and other objects and advantages of the invention will be more readily apparent from a consideration of the following detailed description of the drawings illustrating a preferred embodiment of the invention.

Figure 1:
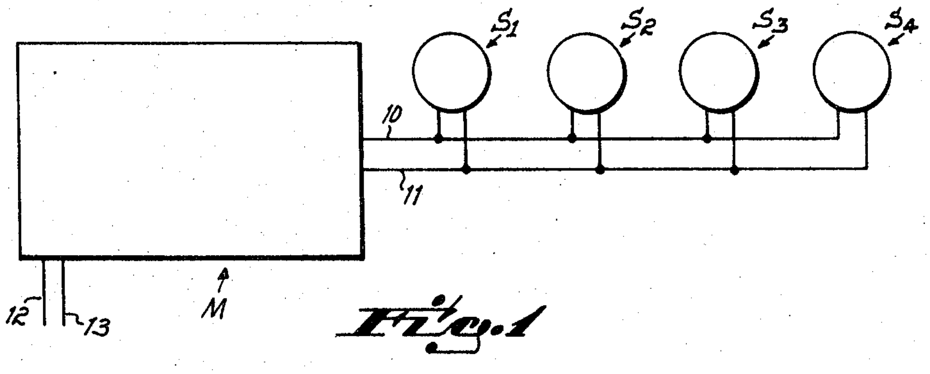
FIGURE 1 depicts a schematic circuit diagram of a clock system constructed in accordance with the principles of this invention showing the relationship of the master clock and the secondary clocks.

A preferred embodiment of the system constructed in accordance with the principles of this invention is depicted schematically in FIGURE 1. The system, more particularly, includes a master clock generally indicated by the letter M and a plurality of secondary clocks $S_1$, $S_2$, $S_3$, and $S_4$. The secondary clocks $S_1$–$S_4$ are connected in parallel across a pair of control lines 10 and 11 emanating from the master clock M. Control pulses are transmitted from the master clock M to the secondary clocks $S_1$–$S_4$ via the lines 10 and 11 for operating the secondary clocks in synchronism with the master clock. The master clock M is connected in turn to a power supply (not shown) via lines 12 and 13. As those skilled in the art will understand, the number of secondary clocks S controlled by the master clock M is not limited to four as shown in FIGURE 1. In practice, the number of secondary clocks utilized will vary in accordance with the needs of the user.

In operation, the master clock M generates pulses of from one to three seconds in duration at the rate of one pulse per minute. These pulses, herein termed minute pulses, are transmitted via control lines 10 and 11 to the secondary clocks $S_1$–$S_4$ where they are effective to advance the minute hand once per minute and, in turn, the hour hand once per hour. In addition, the master clock M generates a sequence of high repetition rate pulses, herein termed correction pulses, once each hour for correcting the minute hands of the secondary clocks. This hourly correction sequence has the capability of correcting clocks which are up to and including 54 minutes fast and 57 minutes slow. In addition, the master clock M generates and transmits to the secondary clocks $S_1$–$S_4$ via lines 10 and 11 a second series of correction pulses every twelve hours. This twelve hour sequence of correction pulses has the capability of correcting secondary clocks which are up to and including eleven hours fast or slow. In both the hourly and twelve hour sequences, the correction pulses are of a first, or negative, polarity for reasons to become apparent.

Figure 3:
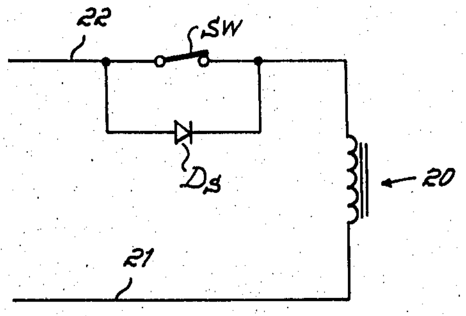
FIGURE 3 depicts a detailed schematic circuit diagram of a secondary clock constructed in accordance with the principles of this invention.

Referring to FIGURE 3, the circuitry of a secondary clock is seen to include an electromagnetic device 20 connected between an input line 21 of the secondary clock and the parallel combination of a diode DS and a switch SW, the parallel combination being connected on its other side to the other secondary clock input line 22. The electromagnetic device 20 may be of any suitable type which is adapted to be energized in response to electric signals of either polarity as, for example, an unpolarized electromagnet. In practice the electromagnetic device 20 has its armature operatively connected to the secondary clock mechanism (not shown) for advancing the minute hand of the secondary clock one minute in response to a single input pulse and the hour hand one hour in response to the incrementing of the minute hand 60 times. The secondary clock mechanism may be of any suitable design which is adapted to be driven in response to pulses generated at the rate of one per minute. An example of such a secondary impulse clock is the type marketed by The Cincinnati Time Recorder Co. and designated IC Series Secondary Clock for use in the M-1-C Master Clock System.

The switch SW is a normally closed switch which is operatively connected to a cam (not shown) driven by the secondary clock mechanism. The switch SW is opened by the cam for a period of approximately two minutes each hour and for an interval of approximately one hour each twelve hour period. Specifically, the switch SW is opened by the cam at the beginning of the 59′ mark and remains open through the completion of the 00′ mark. In addition, the switch SW is opened sometime between 4:40 and 4:59 and remains open until sometime between 5:40 and 5:59. The range of times for opening and closing the switch SW during the approximate one hour period each twelve hour interval is, as a practical matter, necessary to accommodate the manufacturing tolerances of the secondary clock mechanism. Of course, the opening and closing time of the switch SW may be more closely controlled by tightening the manufacturing tolerances of the secondary clock mechanism. However, such strictness in manufacturing tolerances has not been found to be necessary to assure proper operation of the system. As a consequence of the diode DS, the effect of opening the switch SW for a two minute period each hour and for a one hour period every twelve hours is to block negative pulses and thereby render the electromagnetic device 20 of the secondary clock mechanism insensitive to negative pulses generated by the master clock M during certain predetermined portions of the hourly and twelve hour correction cycles to be described.

Figure 2:
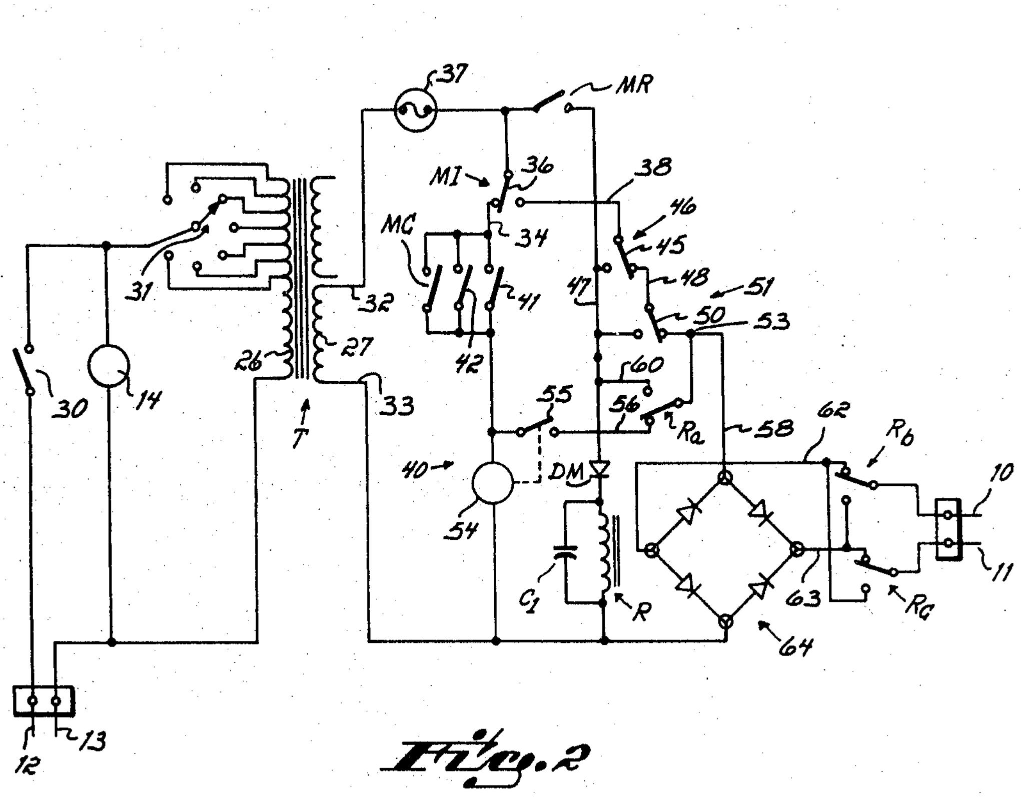
FIGURE 2 depicts a detailed schematic circuit diagram of a master clock constructed in accordance with the principles of this invention.

The master clock M, as shown more particularly in FIGURE 2, include a drive motor 14 connected across the power supply lines 12 and 13 via an on-off switch 30. The drive motor 14 is operatively connected to the clock mechanism (not shown) of the master clock and is adapted to move the minute hand of the master clock once each minute and the hour hand once each hour in a manner well-known to those skilled in the art. The master clock further includes a transformer T having a primary winding 26 connected across the power supply lines 12 and 13 via the series connected on-off switch 30 and a variable tap selector 31. The transformer T has a secondary winding 27 the output of which is taken across lines 32 and 33. Variation of the position of tap 31 permits the output potential of the transformer secondary winding 27 to be altered as may be necessary when the number of secondary clocks driven by the master clock is changed.

The master clock also includes a minute impulse switch MI having a movable contact 36 connected at one end to the hot or positive line 32 via a fuse 37 and at the free end alternately to a line 34 and a line 38. The minute impulse switch MI is actuated by a suitable cam (not shown) driven by the master clock mechanism and is transferred by the cam from the position shown in FIGURE 2 for a three second interval each minute starting at the 57″ mark and terminating at the 00″ mark. This three second transfer each minute connects the positive line 32 to the line 38 producing the minute pulse. The line 34, which is normally connected to the contact 36 of the switch MI is, during the three second interval 00″–57″, connected to a correction pulse generator 40 via the parallel path including a normally open twelve hour corrective switch 41 and a one hour corrective switch 42. The corrective pulse generator 40 includes a motor 54 which, when energized and rotating, sequentially makes and breaks a contact 55 connected between the switches 41 and 42 and a line 56. The pulse generator 40 becomes energized when contact 36 of the minute impulse switch MI is in the position shown and either one of the switches 41 and 42 is closed, and functions to intermittently connect the positive line 32 to the line 56 for producing high repetition rate correction pulses.

The one hour correction switch 42, like the switch MI, is connected to a cam (not shown) driven by the master clock mechanism and is cammed closed once each hour sometime during the five second interval 59′00″–59′05″ and remains closed until sometime during the thirty second interval 00′15″–45″. This switch when closed initiates energization of the motor 54, causing the production of correction pulses for approximately 90 seconds each hour beginning at approximately 59′. The twelve hour correction switch 41, like the switches MI and 42, is driven by suitable cam means (not shown) associated with the master clock mechanism and is closed sometime during the five minute interval 5:00–5:05 and remains closed until sometime during the five minute interval 5:30–5:35. This switch when closed initiates energization of the motor 54, causing the production of correction pulses once every twelve hours for 30–35 minutes beginning at approximately 5:00.

Connected to the line 38 is a movable contact 45 constituting a twelve hour polarity reversal switch 46. The movable contact 45 is connected at its free end alternately to a line 47 and a line 48. The line 47 in turn is connected to a relay R via a diode DM, the other side of the relay being connected to the transformer secondary winding output line 33. A capacitor $C_1$ is connected in parallel with the relay R to delay the de-energization of the relay so that any inductive kick on the clock line 10–11 generated by the secondary clocks will be harmlessly dissipated in the rectifier 64. The relay R has a first contact R–*a* connected between a junction 53 in line 58 and alternately the line 56 and the anode of the diode DM via the line 60. Contact R–*a* prevents correction pulses from being output on lines 10–11 until the relay R has been fully deenergized. The relay R has a second contact R–*b* connected between the master clock output line 10 and alternately an output line 62 and an output line 63 of a full-wave rectifier 64. The relay R has a third contact R–*c* connected between the master clock output line 11 and alternately the negative output line 62 and the positive output line 63 of the rectifier 64. The contacts R–*b* and R–*c* function to reverse the polarity of the signals which are output from the rectifier 64 and applied to the master clock output lines 10 and 11. The rectifier 64 is a conventional diode bridge connected between the lines 58 and 33 and provides full-wave rectification of the transformer output for application to the master clock output lines 10 and 11 via the polarity reversing contacts R–*b* and R–*c*. The line 48, which is with line 47 alternately connected to movable contact 45, is also connected to a movable contact 50 of an hourly polarity reversal switch 51. The free end of the movable contact 50 in turn is alternately connectable between the line 47 and the relay contact R–*a* via the line 58 and junction 53.

The switch 46 is driven by a cam (not shown) associated with the master clock mechanism and is transferred from the position shown for the approximately two and one-half hour period beginning sometime in the four and one-half minute interval 4:00 00′15″–4:00 04′45″ and terminating sometime in the five minute interval 6:25–6:30. The twelve hour polarity reversal switch 46 when transferred reverses the polarity of minute pulses applied to lines 10 and 11 which are generated as a consequence of the periodic transfer of the movable contact 36 during the three second interval 57″–00″ of each minute. This reversal of polarity occurs as a result of the energization of the relay R via contact 45 during the interval that the contact 36 is transferred, which in turn results in the transfer of the relay contacts R–*b* and R–*c* reversing the connection between diode rectifier output lines 62 and 63 and the master clock output lines 10 and 11. When the twelve hour polarity reversal switch contact 45 is not transferred, that is, when it is in the position shown in FIGURE 2, the minute pulses generated by the periodic transfer of contact 36 do not energize the relay R and, consequently, the relay contacts R–*b* and R–*c* are not transferred and the output of the rectifier 64 is applied to the master clock output lines 10 and 11 without a polarity reversal. As used herein, negative pulses result when the relay contacts R–*b* and R–*c* are in the positions shown, while reverse polarity, or positive pulses result when the relay contacts transfer from the positions shown in FIGURE 2.

The contact 50 of hourly polarity reversal switch 51, like contact 45 of twelve hour polarity reversal switch 46, also reverses the polarity of the minute pulses applied to the master clock output lines 10 and 11 as a result of the periodic transfer of the contact 36 of switch MI. Specifically, when the contact 50 transfers, the minute pulses generated by the transfer of contact 36 energize the relay R, causing the contacts R–*b* and R–*c* to transfer, in turn reversing the connections between the rectifier 64 output lines 62 and 63 and the master clock output lines 10 and 11. When the movable contact 50 of the hourly polarity reversal switch 51 is in the position shown, the minute pulses generated by the periodic transfer of the movable contact 36 are applied to the master clock output lines 10 and 11 via the rectifier 64 and the non-transferred relay contacts R–*b* and R–*c* without a polarity reversal.

The system has three principal modes of operation, namely, an hourly correction mode, a twelve hour correction mode, and a normal mode during which time neither of the above correction cycles occurs. In the normal mode of operation which starts somewhere between 05′15″ and 05′45″ with the retransfer of switch contact 50, switches 41, 42, 46 and 51 are not transferred and the relay R is not energized. The movable contact 36 of the minute impulse switch MI, which is driven by its associated master clock cam, transfers from the position shown once each minute for a three second period starting with the 57″ and ending with the 00″. This transfer of the movable contact 36 from the position shown effectively connects the positive line 32 with the line 38 via contact 36. The line 38 in turn is connected to the input line 58 a rectifier 64 via the non-transferred contacts 45 and 50 of switches 46 and 51, respectively. The coupling of the line 32 to the line 38 is, therefore, extended to the rectifier input line 58 where the A.C. transformer output signal on line 32 is rectified. The rectified signal is output on lines 62 and 63 where it is applied, without a polarity reversal, to the master clock output lines 10 and 11 via the non-transferred contacts R–*b* and R–*c*.

The signals on master clock output lines 10 and 11 are then input to the secondary clocks $S_1$–$S_4$ on lines 21 and 22 where they are effective to actuate the electromagnetic device 20 via the switch SW. The electromagnetic device 20, when actuated and released, advances the minute hands of the secondary clocks $S_1$–$S_4$ one minute.

The normal mode of operation continues until the 59′ point is reached with the minute hands of the secondary clocks $S_1$–$S_4$ being periodically incremented up to the 59′ point by the application of pulses from the master clock M on the lines 10 and 11. These pulses, it will be remembered, are of a polarity such that line 11 is positive with respect to line 10. Such pulses herein are termed negative pulses. When the secondary clock reaches the 59′ point in time marking the end of the normal mode of operation and the beginning of the hourly correction cycle, the cam-operated switch SW opens, rendering the electromagnetic device 20 of the secondary clock insensitive to the negative pulses applied thereto on lines 10 and 11. With the switch SW open only positive pulses, that is, pulses in which line 10 is positive relative to line 11, are effective to pass through the diode DS for energization of the electromagnetic device 20 and incrementing of the minute hand.

In addition to the switch SW being cammed open at the 59′ mark, the hourly correction switch 42 is cammed closely by the clock mechanism of the master clock M during the period 59′00″–59′05″ remains closed until sometime during the period 00′15″–00′45″. With the hourly correction switch 42 closed, the positive line 32 is connected to the pulse generator 40 via the movable contact 36 of the switch MI, which is closed during the first 57 seconds of each minute, completing an energization circuit to the correction pulse generator 40. The generator 40 becomes energized causing the movable contact 55 to be interrupted at a high rate of speed, successively and rapidly connecting the positive line 32 to the line 56 via the non-transferred contact 36, transferred contact 42, and intermittently transferred contact 55. The intermittent connection of line 56 with the positive line 32 intermittently and successively applies a positive potential to the input line 58 of the rectifier 64 via the non-transferred contact R–*a* of relay R. The successive interconnection of the positive line 32 and the input line 58 to the rectifier 64 produces successive correction pulses of negative polarity across output lines 10 and 11 of the master clock M via the non-transferred contacts R–*c* and R–*b*. Assuming the clock is slow, switch SW of the secondary clock is closed, the minute hand of the secondary clock not having arrived at the 59′ mark. With switch SW closed the negative correction pulses on lines 10 and 11 which are output from the master clock are transmitted through the switch SW to the electromagnetic device 20 of the secondary clock, actuating the electromagnetic device and advancing the minute hand once per pulse. The successive incrementing of the minute hand in response to the rapidly occurring negative correction pulses continues until the minute hand of the secondary clock arrives at the 59′ mark. Upon the arrival of the minute hand of the secondary clock at the 59′ mark, the switch SW opens and the secondary clock is no longer responsive to the negative correction pulses which are output on lines 10 and 11 of the master clock and input to the secondary clock on lines 21 and 22. At this time the minute hands of both the master clock M and the secondary clock are on the 59′ mark producing a condition of synchronization between the minute hands of both clocks. Thus, no further correction of the minute hand of the secondary clock occurs.

During the interval 59′15″–59′45″ the hour polarity reversal switch 51 transfers, moving contact 50 from junction 53 to the line 47. The transfer of contact 50 is ineffective to complete any circuits until the movable contact 36 of the minute impulse switch MI transfers at the 59′57″ point connecting the positive line 32 to the line 48 via the non-transferred contact 45 of the twelve hour polarity reversal switch 46. With the line 32 connected to the line 48 a positive potential is applied by the transferred contact 50 to the line 47, energizing the relay R via the diode DM. The energization of the relay R in turn transfers contacts R–*a*, R–*b*, and R–*c*. The transfer of the R–*a* contact couples the positive potential present on line 48 via the transferred contact 50, to the input line 58 of the rectifier 64. The positive potential input to the rectifier 64 on line 58 produces an output across lines 62 and 63, constituting the output of the rectifier 64. The rectifier output, in turn, is applied across the transferred contacts R–*b* and R–*c* to the output lines 10 and 11 of the master clock M, producing a reverse polarity, or positive, minute pulse. The positive minute pulse is input to the secondary clock $S_1$–$S_4$ on lines 21 and 22 and, due to diode DS, is effective to energize the electromagnetic device 20 for advancing the minute hand of the secondary clock from 59′ to 00′ notwithstanding the open condition of switch SW.

The transfer of the contact 36 of the minute impulse switch MI at the 59′57″ point is also effective to decouple the correction pulse generator 40 from the positive line 32, de-energizing the pulse generator and terminating the correction pulses output on line 56.

At the 00′ mark the contact 36 of the minute impulse switch MI re-transfers, coupling the positive line 32 to the correction pulse generator 40 via the transferred hourly correction switch 42 which does not open until sometime in the interval 00′15″–00′45″ when the cam operated contact 42 of the hourly correction switch 42 re-transfers to the open position.

At the 00′57″ mark, the movable contact 36 of the minute impulse switch MI again transfers for a three second period connecting the positive line 32 to the transferred contact 50 of the hourly polarity reversal switch 51 via the non-transferred contact 45 of the twelve hour polarity reversal switch 46 and the line 48. With the positive line 32 coupled to the transferred movable contact 50, a positive potential is applied to the line 47 energizing the relay R, via the diode DM. The resulting transfer of contact R–*a* applies the positive potential present on line 47 to the rectifier 64 via input line 58. The input to the rectifier 64 in turn is rectified and applied on line 62 and 63 to the master clock output lines 10 and 11 via the transferred contacts R–*b* and R–*c* producing on lines 10 and 11 a positive minute pulse. This positive minute pulse is input on lines 21 and 22 to the secondary clocks $S_1$–$S_4$ where it is passed by the diode DS to the electromagnetic device 20, advancing the minute hand of the secondary clock to 01′.

At the approximate 02′ mark, 03′ mark, 04′ mark and 05′ mark similar positive minute pulses are generated by the transfer of the movable contact 36 of the minute impulsing switch MI and applied to the secondary clocks $S_1$–$S_4$ via lines 10 and 11 for advancing the minute hands successively to 02′, 03′, 04′ and 05′. During the interval 5′5″–5′45″ the movable contact 50 of the hourly polarity reversal switch 51 re-transfers to the position shown in the drawings, marking the end of the hourly correction cycle and the beginning of the normal mode of operation. The re-transfer of the contact 50 prevents the relay R from becoming energized during the three second period each minute when the contact 36 of the minute impulsing switch MI transfers. Consequently, successive minute impulses are negative due to the re-transfer of the relay contacts R–*b* and R–*c*. These negative impulses are, however, gated through the switch SW of the secondary clock $S_1$–$S_4$, energizing the electromagnetic device 20 once each minute for successively incrementing the minute hand through the 59′ point whereupon the hourly correction cycle is re-initiated.

In the description of the operation of the twelve hour correction cycle which follows, arbitrary times for switching of certain of the switches, which as described previously switch within a time range, are selected for the purposes of illustration. Specifically, the hourly correction switch 42, which normally opens within the time range 59′00″–59′05″ and closes in the range 00′15″–00′45″, is assumed to open at 59′05″ and close at 00′30″. The twelve hour correction switch 41, which closes in the range of 5:00–5:05 and opens in the range of 5:30–5:35, is assumed to close at 5:00 and open at 5:30. The twelve hour polarity reversal switch 46, which normally transfers from the position shown in FIGURE 2 in the range of 4:00 15″–4:04 45″ and re-transfers to the position shown in FIGURE 2 in the range of 6:25–6:30, is assumed for the purpose of the following example to transfer at 4:00:30 from the position shown and re-transfer to the position shown at 6:30. Finally, the hourly polarity reversal switch 51, which normally transfers from the position shown in FIGURE 2 in transfers from the position shown in FIGURE 2 in the range 59′15″–59′45″ and re-transfers to the position shown in the range 5′15″–5′45″, in the following example is assumed to transfer at 59′30″ and re-transfer at 5′30″. It should be understood that the above noted arbitrary switching times selected from the ranges of switching times for the various switches of the preferred embodiment are merely selected for the purpose of the following discussion.

It is further assumed for the purpose of the following discussion of the twelve hour correction cycle that master clock M controls four secondary clocks $S_1$–$S_4$, each of which has a switch SW which is open during both the 59′ and 00′ of each hour and the period 4:59–5:40 of each twelve hour interval. In this regard, it should also be understood that the choice of four secondary clocks to be controlled in response to signals from the master clock M is merely for purposes of illustration.

For the purposes of the following illustration of the twelve hour correction cycle, it is assumed that the master and secondary clocks display, respectively, the following times:

| | |
|---|---|
| M | 3:15 |
| $S_1$ | 12:00 |
| $S_2$ | 2:30 |
| $S_3$ | 3:15 |
| $S_4$ | 4:10 |

Secondary clock $S_3$ is the only secondary clock displaying the proper time, the remaining clocks $S_1$ and $S_2$ being 3 hours 15 minutes and 45 minutes slow, respectively, and secondary clock $S_4$ being 55 minutes fast. The clock $S_1$ is unresponsive to negative pulses since its switch SW is open, switch SW having been opened at the 59′ mark and remains open through the 00′ point. Secondary clock $S_1$ will, however, respond to positive minute pulses which pass through its diode DS. The secondary clocks $S_2$, $S_3$, and $S_4$ are responsive to both negative and positive pulses since their respective switches SW are closed, the switches SW remaining closed except for the two minute interval during the 59′ and 00′, which occurs each hour and the 41 minute interval which occurs every twelve hours between 4:59–5:40.

| | |
|---|---|
| M | 3:16 |
| $S_1$ | 12:00 |
| $S_2$ | 2:31 |
| $S_3$ | 3:16 |
| $S_4$ | 4:11 |

At 3:16 the master clock M generates a three second negative minute pulse starting at 3:15′57″ and ending at 3:16′00″. Specifically, contact 36 of switch MI transfers from the position shown in FIGURE 2 connecting line 32 to line 11 via contact 45, line 48, contact 50, line 58, rectifier 64, and contact R–*c*. The minute pulse generated by the master clock is negative because neither the hourly polarity reversal switch 51 nor the twelve hour polarity reversal switch 46 is transferred at this time. The negative minute pulse is ineffective to advance the minute hand of the clock $S_1$ inasmuch as clock $S_1$ has its switch SW open making it unresponsive to negative pulses. The negative minute pulse is, however, effective to advance secondary clocks $S_2$, $S_3$ and $S_4$ one minute since none of these three clocks have their switches SW open to thereby block negative minute pulses.

| | |
|---|---|
| M | 3:44 |
| $S_1$ | 12:00 |
| $S_2$ | 2:59 |
| $S_3$ | 3:44 |
| $S_4$ | 4:39 |

In the period between 3:16 and 3:44 the master clock generates 28 negative minute pulses, the pulses being negative since neither the hourly polarity reversal switch 51 nor the twelve hour reversal switch 46 is transferred. The 28 negative minute pulses generated by the master clock are ineffective to advance clock $S_1$ inasmuch as the switch SW of the secondary clock $S_1$ is still open. Secondary clock $S_2$ is responsive to the 28 negative minute pulses and advances to 2:59 whereupon its switch SW is open for the two minute interval 59′–00′. Secondary clocks $S_3$ and $S_4$ also respond to the 28 negative minute pulses and advance to 3:44 and 4:39, respectively. At this point, secondary clock $S_1$ still has its switch SW open and is, therefore, still unresponsive to negative pulses. Secondary switch $S_2$ has just had its switch SW opened and now is also unresponsive to negative pulses. However, secondary clocks $S_3$ and $S_4$, not having reached the 59′ mark, still have their switches SW closed and therefore are both responsive to negative minute pulses.

| | |
|---|---|
| M | 3:45 |
| $S_1$ | 12:00 |
| $S_2$ | 2:59 |
| $S_3$ | 3:45 |
| $S_4$ | 4:40 |

The negative minute pulse generated by the master clock during the interval 3:44′57″–3:45′00″ is still ineffective to advance secondary clocks $S_1$ and $S_2$ since their switches SW are open. The negative minute pulse is, however, effective to advance secondary clocks $S_3$ and $S_4$ one minute.

| | |
|---|---|
| M | 3:59 |
| $S_1$ | 12:00 |
| $S_2$ | 2:59 |
| $S_3$ | 3:59 |
| $S_4$ | 4:54 |

The master clock in the interval 3:45–3:59 generates 14 negative minute pulses. These negative minute pulses are ineffective to advance secondary clocks $S_1$ and $S_2$ since their switches SW still remain open. The 14 negative minute pulses are, however, effective to advance secondary clocks $S_3$ and $S_4$. Specifically, secondary clock $S_3$ responds to the negative minute pulse and advances from 3:45 to 3:59 whereupon its switch SW is opened for the two minute interval 59′–00′. Secondary $S_3$, now that its switch SW is open, is unresponsive to negative pulses. The 14 negative minute pulses advance the secondary clock $S_4$ from 4:40–4:54. The secondary clock $S_4$ is still responsive to negative minute pulses inasmuch as its switch SW has not yet been opened.

| | |
|---|---|
| M | 4:00 |
| $S_1$ | 12:01 |
| $S_2$ | 3:00 |
| $S_3$ | 4:00 |
| $S_4$ | 5:00 |

At 3:59 the hourly correction cycle begins. Specifically, at the 59′ 05″ mark switch 42 closes energizing the pulse generator 40 through the normally closed contact 36 causing negative correction pulses at the rate of 70 pulses per minute to be transmitted to the secondary clocks via line 56, un-transferred contact R–*a*, line 58, rectifier 64, and un-transferred contact R–*b* and R–*c*. The negative correction pulses are ineffective to advance secondary clocks $S_1$, $S_2$, and $S_3$ since their switches SW are open and, therefore, the respective clocks are unresponsive to negative pulses.

However, secondary clock $S_4$ has not yet advanced to the 4:59 mark and, therefore, is responsive to the first 5 negative correction pulses and advances to 4:59 whereupon its switch SW opens rendering clock $S_4$ unresponsive to further negative correction pulses. The switch SW of secondary clock $S_4$ remains open for the interval 4:59–5:40 as required by the twelve hour correction cycle mode of operation.

At the 59′30″ mark the hourly polarity switch 51 transfers from the position shown in FIGURE 2 conditioning the relay R for energization when the minute impulse contact 36 transfers for three seconds at the 59′57″–00′00″ interval. When the 59′57″ point is reached the relay R is energized via transferred contact 36, re-transferred contact 45, transferred contact 50, and diode DM. With the relay R energized, the contacts R–*a*, R–*b* and R–*c* transfer. The transfer of contact R–*a* prevents the application of further negative correction pulses to the secondary clocks. The transfer of contacts R–*b* and R–*c* reverse the polarity of signals which are output from the rectifier 64 and applied to the master clock output lines 10 and 11. Hence, with the contacts R–*b* and R–*c* transferred, the three second duration minute pulse generated during the interval 59′57″–00′00″ is reversed in polarity, that is, negative to positive, and is effective to advance all the clocks one minute. Specifically, secondary clocks $S_1$, $S_2$, $S_3$ and $S_4$ advance from 12:00 to 12:01, 2:59 to 3:00, 3:59 to 4:00, and 4:59 to 5:00, respectively.

The switch SW of secondary clock $S_1$ is now closed, the clock having advanced past the interval 59′–00′. Hence, secondary clock $S_1$ is responsive to negative minute pulses. However, clocks $S_2$, $S_3$ and $S_4$ are unresponsive to negative pulses, clock $S_4$ being unresponsive for the reason previously noted, and clocks $S_2$ and $S_3$ being unresponsive because the switches SW are open for the period 59′–00′ as required by the hourly correction cycle.

| | |
|---|---|
| M | 4:00 30″ |
| $S_1$ | 12:35 |
| $S_2$ | 3:00 |
| $S_3$ | 4:00 |
| $S_4$ | 5:00 |

At 4:00 00′ when the three second minute pulse terminates, the contact 36 re-transfers to the position shown in FIGURE 2 interrupting the energization circuit for the relay R and completing an energization circuit through a closed contact 42 for the pulse generator 40. With an energization circuit complete for the pulse generator 40, negative correction pulses are generated which are fed to all of the clocks $S_1$–$S_4$ via line 56, re-transferred contact R–*a*, line 58, rectifier 64, lines 62 and 63, and re-transferred contacts R–*b* and R–*c*. These negative correction pulses are produced for approximately 30 seconds, advancing the secondary clock $S_1$ to 12:35. The secondary clocks $S_2$, $S_3$ and $S_4$ are unresponsive to the negative correction pulses and, therefore, remain at 3:00, 4:00 and 5:00, respectively.

At the 00′30″ point the hourly correction switch 42 opens, interrupting the energization path which includes the contact 36, to the pulse generator 40, terminating the generation of negative correction pulses. Consequently, the minute hand of clock $S_1$ is not further advanced or corrected.

| | |
|---|---|
| M | 4:01 |
| $S_1$ | 12:36 |
| $S_2$ | 3:01 |
| $S_4$ | 5:01 |
| $S_3$ | 4:01 |

At 4:01 a positive minute pulse is applied to all of the clocks $S_1$–$S_4$ advancing each of the clocks one minute. The minute pulse is positive because the hourly polarity reversal switch contact 50 is transferred from the position shown in FIGURE 2 for the interval 59′30″–05′30″, causing the transfer of the contact 36 during the 57″–00″ interval to energize the relay R in turn producing the transfer of the contacts R–*b* and R–*c*, transferring the polarity of minute pulses in the manner described previously.

| | |
|---|---|
| M | 4:02 |
| $S_1$ | 12:37 |
| $S_2$ | 3:02 |
| $S_3$ | 4:02 |
| $S_4$ | 5:02 |

For the same reason given in the paragraph immediately above, all of the clocks are advanced one minute in response to a positive minute pulse generated during the interval 4:01′57″–4:02′00″. In addition, secondary clocks $S_2$, $S_3$ and $S_4$ have their switch SW closed in response to the advancement of their minute hands past the 59″–00″ interval.

| | |
|---|---|
| M | 4:03 |
| $S_1$ | 12:38 |
| $S_2$ | 3:03 |
| $S_3$ | 4:03 |
| $S_4$ | 5:03 |

For the reasons given in the paragraph immediately above, the clocks $S_1$–$S_4$ advance one minute in response to a positive minute pulse. In addition, the twelve hour polarity reversal switch 46 transfers from the position shown in FIGURE 2, conditioning the relay R for energization to thereby transfer the contacts R–*b* and R–*c* for reversing the polarity of the minute pulse each time the contact 36 transfers for the three second interval 57″–00″. The switch 46 remains transferred from the position shown in FIGURE 2 until 6:30. Consequently, all minute pulses from 4:03 to 6:30 will be positive due to the transfer of switch 46, enabling correct clocks to be maintained on time notwithstanding the fact that their switches SW are open for the interval 4:59–5:40.

| | |
|---|---|
| M | 4:59′00″ |
| $S_1$ | 1:34 |
| $S_2$ | 3:59 |
| $S_3$ | 4:59 |
| $S_4$ | 5:59 |

During the interval 4:03–4:59, 56 positive minute pulses are generated by the master clock which are effective to advance each of the clocks 56 minutes. The switch SW of the clock $S_2$ is now open and remains open for the interval 59′–00′ as required by the hourly correction cycle and, consequently, is unresponsive to negative correction pulses during this two minute interval. The switch SW of the clock $S_3$ is also open and remains open for the interval 4:59–5:40 as required by the twelve hour correction cycle and, consequently, is insensitive to negative correction pulses. When clock $S_4$ displays 5:40 the switch SW of clock $S_4$ closes as required by the twelve hour correction cycle. The closing of switch SW of clock $S_4$, however, is ineffective to alter the operation of $S_4$ during the period 5:03–5:59 since the minute pulses are positive. The switch SW of secondary clock $S_4$ again opens at the 5:59 mark for the two minute interval 59′–00′ as required by the hourly correction cycle.

| | |
|---|---|
| M | 4:59 (end) |
| $S_1$ | 1:59 |
| $S_2$ | 3:59 |
| $S_3$ | 4:59 |
| $S_4$ | 5:59 |

At 4:59′05″ the master clock is effective to generate hourly negative correction pulses. These pulses advance the minute hand of the secondary clock $S_1$ to the 59′ mark, the clocks $S_2$–$S_4$ being unresponsive to negative correction pulses inasmuch as their switches SW are open. Thus, as the master clock M is about to advance to 5:00, all minute hands on the secondary clocks are in agreement with the minute hand on the master clock and all are set on the 59′ mark.

| | |
|---|---|
| M | 5:00 |
| $S_1$ | 2:00 |
| $S_2$ | 4:00 |
| $S_3$ | 5:00 |
| $S_4$ | 6:00 |

At 5:00 a positive minute pulse is generated by the master clock and is effective to advance all of the secondary clocks one minute. At this time all the switches SW of the clocks $S_1$–$S_4$ are open as required by the hourly correction cycle. Switches SW of clocks $S_1$, $S_2$, and $S_4$ remain open only until the 01′ point as required by the hourly correction cycle, whereas the switch SW of clock $S_3$ remains open until $S_3$ registers 5:40 as required by the twelve hour correction cycle. The open condition of switches $S_1$–$S_4$ prevents their responding to negative correction pulses.

In addition the twelve hour correction switch 41 closes at 5:00 enabling an energization circuit to be completed to the pulse generator 40 when the contact 36 re-transfers to the position shown in FIGURE 2 at the end of the three second interval 4:59′57″–5:00′00″. However, the negative correction pulses are ineffective to advance any of the secondary clocks because their switches SW are open for the reasons indicated above.

| | |
|---|---|
| M | 5:01 |
| $S_1$ | 2:01 |
| $S_2$ | 4:01 |
| $S_3$ | 5:01 |
| $S_4$ | 6:01 |

A positive minute pulse is generated by the master clock advancing all clocks one minute. The switches SW of the secondary clocks $S_1$, $S_2$ and $S_4$ now close as required by the hourly correction cycle permitting the secondary clocks $S_1$, $S_2$ and $S_4$ to respond to negative correction pulses generated in accordance with the twelve hour correction cycle. Switch SW of clock $S_3$ remains open as required by the twelve hour correction cycle, the switch SW of clock $S_3$ having been opened when clock $S_3$ advanced to 4:59 and remains open until clock $S_3$ advances to 5:40.

| | |
|---|---|
| M | 5:01 (end) |
| $S_1$ | 2:59 |
| $S_2$ | 4:59 |
| $S_3$ | 5:01 |
| $S_4$ | 6:59 |

The negative correction pulses generated by the master clock as a consequence of the closing of the twelve hour correction switch 41 at 5:00 is effective to advance the minute hands of the clocks $S_1$, $S_2$ and $S_4$ 58 minutes whereupon the switches SW of the secondary clocks $S_1$, $S_2$ and $S_4$ open when their respective clocks reach the 59′ mark rendering the clocks $S_1$, $S_2$ and $S_4$ unresponsive to further negative correction pulses. Switch SW of clock $S_2$ remains open until clock $S_2$ registers 5:40 whereupon it opens as required by the twelve hour correction cycle. Clock $S_3$ is also unresponsive to negative pulses and remains so until clock $S_3$ registers 5:40 whereupon switch SW closes as required by the twelve hour correction cycle.

| | |
|---|---|
| M | 5:02 |
| $S_1$ | 3:00 |
| $S_2$ | 5:00 |
| $S_3$ | 5:02 |
| $S_4$ | 7:00 |

In response to the positive minute pulse generated by the master clock each of the secondary clocks $S_1$–$S_4$ advances one minute. Switches SW of clocks $S_1$ and $S_4$ are open and remain open until clocks $S_1$ and $S_4$ register 01′ as required by the hourly correction cycle. Switches SW of the clocks $S_2$ and $S_3$ are open and remain open until their respective clocks indicate 5:40 in accordance with the twelve hour correction cycle. With switches SW of clocks $S_1$–$S_4$ open, none of the clocks accept the negative correction pulses being generated by the master clock during the period 5:00–5:30 as required by the twelve hour correction cycle.

| | |
|---|---|
| M | 5:03 |
| $S_1$ | 3:01 |
| $S_2$ | 5:01 |
| $S_3$ | 5:03 |
| $S_4$ | 7:01 |

All of the clocks are responsive to the positive minute pulses generated by the master clock and advance one minute. Switches SW of the clocks $S_1$ and $S_4$ close upon the completion of the 59′–00′ interval as required by the hourly correction cycle. Consequently, clocks $S_1$ and $S_4$ are responsive to negative correction pulses generated during the period 5:00–5:30. However, switches SW of the secondary clocks $S_2$ and $S_3$ remain open until 5:40 as required by the twelve hour correction cycle and, consequently, clocks $S_2$ and $S_3$ do not advance in response to the negative correction pulses being generated.

| | |
|---|---|
| M | 5:03 (end) |
| $S_1$ | 3:59 |
| $S_2$ | 5:01 |
| $S_3$ | 5:03 |
| $S_4$ | 7:59 |

The clocks $S_1$ and $S_4$ which have their switches SW closed and are, therefore, responsive to the negative correction pulses, advance 58 minutes. At this point switches SW of the clocks $S_1$ and $S_4$ open as required by the hourly correction cycle and remain open during the interval 59–00′. Switches SW of clocks $S_2$ and $S_3$ continue to remain open until 5:40 as required by the 12 hour correction cycle. Switch SW of the clocks $S_1$–$S_4$, being open, do not respond to negative correction pulses.

| | |
|---|---|
| M | 5.04 |
| $S_1$ | 4:00 |
| $S_2$ | 5:02 |
| $S_3$ | 5:04 |
| $S_4$ | 8:00 |

All the clocks $S_1$–$S_4$ are responsive to the positive minute pulse generated by the master clock and advance one minute. At this point, switches SW of clocks $S_1$ and $S_4$ close in response to the termination of the interval 59′–00′ during which time the switches SW are normally open as required by the hourly correction cycle. Switches SW of clocks $S_2$ and $S_3$, however, remain open until 5:40 as required by the twelve hour correction cycle. Hence, only clocks $S_1$ and $S_4$ are now responsive to negative correction pulses generated during the twelve hour correction cycle interval 5:00–5:30.

| | |
|---|---|
| M | 5:05 |
| $S_1$ | 4:01 |
| $S_2$ | 5:03 |
| $S_3$ | 5:05 |
| $S_4$ | 8:01 |

All of the clocks respond to the positive minute pulse and advance one minute. Switches SW of clocks $S_1$ and $S_4$ close as clocks $S_1$ and $S_4$ complete the 59′–00′ interval. Switches SW of clocks $S_2$ and $S_3$ remain open as required by the twelve hour correction cycle.

| | |
|---|---|
| M | 5:05 (end) |
| $S_1$ | 4:59 |
| $S_2$ | 5:03 |
| $S_3$ | 5:05 |
| $S_4$ | 8:59 |

The clocks $S_1$ and $S_4$, the switches SW of which have closed as required by the hourly correction cycle, are responsive to the negative correction pulses generated during the twelve hour correction period 5:00–5:30 and advance 58 minutes to 4:59 and 8:59, respectively. The switches SW of the clocks $S_1$ and $S_4$ open upon reaching the 59′ mark. Specifically, the switch SW of clock $S_1$ opens and remains open until 5:40 as required by the twelve hour correction cycle. The switch SW of clock $S_4$ opens upon reaching the 59′ mark and remains open for two minutes until clock $S_4$ registers 9:01 as required by the hourly correction cycle.

The clocks $S_2$ and $S_3$ have their switches SW open until they register 5:40 and, consequently, are unresponsive to the negative correction pulses. As a result, clocks $S_2$ and $S_3$ do not advance with the clocks $S_1$ and $S_4$. At this point all switches SW are open.

| | |
|---|---|
| M | 5:06 |
| $S_1$ | 5:00 |
| $S_2$ | 5:04 |
| $S_3$ | 5:06 |
| $S_4$ | 9:00 |

All the clocks respond to the positive minute pulse generated by the master clock and advance one minute. Switches SW of clocks $S_1$, $S_2$ and $S_3$ remain open until 5:40 as required by the twelve hour correction cycle. Switch SW of clock $S_4$ remains open through the interval 59′–00′ as required by the hourly correction cycle. With all the switches SW open, none of the clocks $S_1$–$S_4$ are responsive to negative correction pulses being generated by the master clock during the period 5:00–5:30, the correction pulses being generated as a consequence of the closing of the twelve hour correction switch 41 during this 30 minute interval.

| | |
|---|---|
| M | 5:07 |
| $S_1$ | 5:07 |
| $S_2$ | 5:05 |
| $S_3$ | 5:07 |
| $S_4$ | 9:01 |

All the clocks are responsive to the positive minute pulse generated by the master clock and advance one minute. At this point, the switch SW of the clock $S_4$ closes in accordance with the hourly correction cycle, and, therefore, is responsive to the negative correction pulses generated during the interval 5:00–5:30. However, the switches SW of the clocks $S_1$–$S_3$ remain open until their respective clocks display the time 5:40 as required by the twelve hour correction cycle and, hence, are unresponsive to negative correction pulses.

| | |
|---|---|
| M | 5:22 |
| $S_1$ | 5:16 |
| $S_2$ | 5:20 |
| $S_3$ | 5:22 |
| $S_4$ | 4:59 |

Secondary clock $S_4$ is the only clock having its switch SW closed and, therefore, is responsive to the negative correction pulses being generated during the interval 5:00–5:30. Consequently, the clock $S_4$ advances 58 minutes to 9:59 whereupon its switch SW remains open for the interval 59′–00′ as required by the hourly correction cycle. The clock $S_4$ advances from 9:59 to 10:00 and from 10:00 to 10:01 in response to the next two positive minute pulses generated by the master clock during the interval 4:03–6:30. At 10:01 switch SW of clock $S_4$ closes as required by the minute pulse whereupon its switch SW closes. With the switch SW of secondary clock $S_4$ closed, the clock $S_4$ is again responsive to negative correction pulses and advance to 10:59, whereupon the hourly correction cycle is again repeated. This process continues whereby the clock $S_4$ advances rapidly 58 minutes and then at the rate of one minute per minute for two minutes until it reaches 4:59 whereupon its switch SW opens and remains open until it registers 5:40 as required by the twelve hour correction cycle. In the meantime, the clocks $S_1$–$S_3$ each advance 15 minutes in response to the 15 positive minute pulses generated by the master clock during the interval 5:07–5:22. At this point, the switch SW of clocks $S_1$–$S_4$ are all open, and remain open until 5:40 as required by the twelve hour correction cycle. The clocks are all now unresponsive to negative correction pulses.

| | |
|---|---|
| M | 5:23 |
| $S_1$ | 5:17 |
| $S_2$ | 5:21 |
| $S_3$ | 5:23 |
| $S_4$ | 5:00 |

Each of the clocks $S_1$–$S_4$ advance one minute in response to the positive minute pulse generated by the master clock. At this point, all the switches SW of the clocks $S_1$–$S_4$ are now open rendering the clocks $S_1$–$S_4$ unresponsive to negative correction pulses generated during the interval 5:00–5:30 by the master clock.

| | |
|---|---|
| M | 5:59 |
| $S_1$ | 5:53 |
| $S_2$ | 5:57 |
| $S_3$ | 5:59 |
| $S_4$ | 5:36 |

All of the clocks $S_1$–$S_4$ respond to the 36 positive minute pulses generated during the interval 5:23–5:59 and advance 36 minutes. At this point, the switches SW of clocks $S_1$ and $S_2$ are closed, the switches being closed at 5:40 as required by the twelve hour correction cycle. However, since the negative correction pulses ceased being generated by the master clock at 5:30, the closing of switches SW of clocks $S_1$ and $S_2$ is ineffective to advance these clocks. Switch SW of clock $S_3$ is open as required by the hourly correction cycle. Switch SW of clock $S_4$ is open and remains open until 5:40 as required by the twelve hour correction cycle. With only switches SW of clocks $S_1$ and $S_2$ closed, only clocks $S_1$ and $S_2$ are responsive to the negative correction pulses generated by the master clock at 5:59 as required by the hourly correction cycle. Hence, only clock $S_1$ and $S_2$ can advance in response to the negative correction pulses. Since the switches SW of clocks $S_3$ and $S_4$ are open, the clocks do not respond to the negative correction pulses generated by the master clock at 5:59.

| | |
|---|---|
| M | 5:59 (end) |
| $S_1$ | 5:59 |
| $S_2$ | 5:59 |
| $S_3$ | 5:59 |
| $S_4$ | 5:36 |

Clocks $S_1$ and $S_2$, which have their switches SW closed, are responsive to the negative correction pulses generated by the master clock and advance until their respective clocks display 5:59 whereupon their switches SW open as required by the hourly correction cycle. Clock $S_3$ does not advance inasmuch as it already displays 5:59 and, therefore, its switch SW is open and the clock $S_3$ is unresponsive to negative correction pulses. Clock $S_4$ has its switch SW open and, therefore, is also unresponsive to negative correction pulses. Consequently, clock $S_4$ does not advance. At this point, the switches SW of clocks $S_1$–$S_3$ are opened in accordance with the hourly correction cycle. Switch SW of clock $S_4$ is open in response to the twelve hour correction cycle and remains open until it displays 5:40. Since all of the switches SW of the clocks $S_1$–$S_4$ are opened, the negative correction pulses generated during the interval 59′05″–00′30″ are ineffective to further advance the clocks $S_1$–$S_4$.

| | |
|---|---|
| M | 6:00 |
| $S_1$ | 6:00 |
| $S_2$ | 6:00 |
| $S_3$ | 6:00 |
| $S_4$ | 5:37 |

Each of the clocks respond to the positive minute pulse generated by the master clock at 6:00 and advance one minute. At this point, the switches SW of clocks $S_1$–$S_3$ are open as a consequence of the hourly correction cycle and remain open until 6:01 whereupon they close. Switch SW of clock $S_4$ is open and remains open until its clock indicates 5:40 whereupon it closes.

| | |
|---|---|
| M | 6:03 |
| $S_1$ | 6:03 |
| $S_2$ | 6:03 |
| $S_3$ | 6:03 |
| $S_4$ | 5:40 |

Each of the clocks respond to the positive minute pulses generated by the master clock during the interval 6:00–6:03 and advance three minutes. At this point, the switch SW of clock $S_4$ closes as required by the twelve hour correction cycle rendering clock $S_4$ sensitive to the negative minute pulses.

| | |
|---|---|
| M | 6:59 |
| $S_1$ | 6:59 |
| $S_2$ | 6:59 |
| $S_3$ | 6:59 |
| $S_4$ | 6:36 |

All of the clocks respond, during the period 6:03–6:30, to the positive minute pulses and, during the interval 6:31–6:59, to the negative minute pulses, advancing the clocks a total of 56 minutes. At this point the switches SW of clocks $S_1$–$S_3$ open as a consequence of the hourly correction cycle and, consequently, are unresponsive to negative correction pulses generated by the master clock at 6:59. However, the switch SW of clock $S_4$ is closed inasmuch as that clock has not reached the 59′ point. Consequently, the clock $S_4$ is responsive to negative correction pulses generated by the master clock during the interval 6:59 05′–7 00′ 30″.

| | |
|---|---|
| M | 6:59 |
| $S_1$ | 6:59 |
| $S_2$ | 6:59 |
| $S_3$ | 6:59 |
| $S_4$ | 6:59 |

Since only switch SW of the secondary clock $S_4$ is closed, clock $S_4$ not having reached the 59′ mark, only clock $S_4$ responds to the negative correction pulses during the hourly correction cycle. Clock $S_4$ advances to the 6:59 point in response to the negative correction pulses whereupon its switch SW opens as required by the hourly correction cycle. At this point, all the clocks have their switches SW open and, consequently, are not responsive to further correction pulses. The clocks $S_1$–$S_4$ are now synchronized with the master clock and must await the next positive minute pulse at 7:00 whereupon all of the clocks advance in unison one minute to the 7:00 point.

If desired, the master clock circuit depicted in FIGURE 2 may be provided with suitable manually controlled switches for generating negative correction and positive minute pulses to thereby permit selective manual advancement of the secondary clocks. Specifically, a manually controlled correction switch MC connected in shunt with switches 41 and 42 may be provided for permitting the selective energization of the correction pulse generator 40, and a manually controlled polarity reversing switch MR connected between lines 32 and 47 may be provided for selectively generating positive minute pulses.

In operation, if the secondary clocks are to be manually advanced, the switch MC is closed completing an energization circuit through the non-transferred minute impulse switch MI and closed switch MC to the motor 54, energizing the motor. The energized motor 54 intermittently transfers contact 55, producing negative correction pulses on master clock output lines 10 and 11 via line 56, nontransferred contact R–*a*, line 58, bridge rectifier 64, rectifier output lines 62 and 63, and non-transferred contacts R–*b* and R–*c*. The negative correction pulses output on lines 10 and 11 are input to the secondary clocks $S_1$–$S_4$, advancing the minute hands of the respective clocks to the 59′ mark whereupon their switches SW open preventing their response to further negative correction pulses. When all the minute hands of the secondary clocks $S_1$–$S_4$ have advanced to the 59′ mark, the manually controlled switch MC is opened terminating the production of the negative correction pulses on lines 10 and 11.

To advance the minute hands of the clocks $S_1$–$S_4$ to the 01′ mark and thereby close their respective switches SW, rendering clocks $S_1$–$S_4$ responsive to additional negative correction pulses, the manually controlled switch MR is momentarily closed twice in succession, momentarily energizing the relay R through the rectifying diode DM for two brief and successive periods. During each of the brief energization periods of relay R, the contacts R–*a*, R–*b* and R–*c* transfer. The transfer of contacts R–*b* and R–*c* introduces a polarity reversal between the output of the bridge rectifier 64 and the master clock output lines 10 and 11 which causes a positive pulse to be input to the secondary clocks $S_1$–$S_4$ through the transferred contact R–*a* upon de-energization of the relay R. The positive pulses produced during the first brief energization period of the relay R advances the minute hands of the secondary clocks from the 59′ mark to the 00′ mark. The minute hands of the secondary clocks $S_1$–$S_4$ are advanced from the 00′ mark to the 01′ mark by the positive pulse output on lines 10 and 11 at the end of the second brief energization period of the relay R. With the minute hands of the secondary clocks at the 01′ position the switches SW are closed and the secondary clocks are responsive to negative correction pulses.

The above process of closing the switch MC and generating negative correction pulses until all the minute hands have advanced to the 59′ mark, followed by momentarily closing the switch MR twice to successively advance the minute hands to the 00′ mark and 01′ mark is repeated until all of the clocks are synchronized, that is, until the minute and hour hands of all the clocks display the same time, except that from 4:59–5:40 the switch MR of the master clock is momentarily actuated, advancing the clocks one minute per MR switch actuation.

From the above disclosure of the general principles of the present invention and the detailed description of a preferred embodiment, those skilled in the art will readily comprehend various modifications to which the invention is susceptible.

Having described my invention, I claim:

1. In a clock system including a secondary time display unit having a secondary mechanism responsive to pulses for incrementing the secondary minute and hour indicator, and also including a master clock having a master clock mechanism for advancing the master minute and hour indicator to provide an indication of the proper time, a self-correcting apparatus comprising:

a minute pulse generator responsive to said master clock mechanism for generating minute pulses of a first polarity once per minute;

a pair of master output lines;

a correction pulse generator responsive to said master clock mechanism for generating and coupling to said master output lines a sequence of correction pulses of said first polarity during a predetermined correction interval of each hour, said hourly correction interval commencing when said master minute indicator reaches a first predetermined arbitrary minute indication, said correction pulses having a repetition rate at least sufficient to increment said secondary minute indicator at the rate of approximately sixty increments per minute;

selectively operable polarity reversing means connected between said minute pulse generator and said master output lines for reversing the polarity of a predetermined number of minute pulses next succeeding the minute pulse which coincides with the arrival of said master minute indicator at said first arbitrary minute indication; and circuit means interconnecting said secondary mechanism and said master output lines for blocking pulses of said first polarity and passing pulses of said reverse polarity for a second interval beginning when the secondary minute indicator reaches said first predetermined arbitrary minute indication and terminating when said secondary minute indicator advances the number of minutes corresponding to said predetermined number of minute pulses thereby enabling a fast secondary time display unit to be unresponsive to correction and minute pulses of said first polarity upon reaching said first arbitrary time indication and be delayed until said secondary minute indicator is synchronized with said master minute indicator while enabling the minute indicator of a slow secondary minute display unit to rapidly advance to said first arbitrary time indication in response to said correction pulses for becoming synchronized with said master minute indicator.

2. The apparatus of claim 1 wherein said circuit means includes a diode poled to pass said reverse polarity pulses and block said first polarity pulses, and a switch connected in parallel with said diode, said switch opening in response to the arrival of said secondary minute indicator at said first arbitrary minute indication for blocking said first polarity pulses and closing in response to the occurrence of said predetermined number of pulses for passing minute pulses of said first polarity.

3. The apparatus of claim 1 wherein said polarity reversing means includes a relay having first and second contacts, said relay controlling said first and second contacts for reversing the connection between said minute pulse generator and said master output lines for a duration corresponding to the occurrence of said predetermined number of minute pulses next succeeding the minute pulse coinciding with the arrival of said master minute indicator at said first arbitrary minute indication.

4. The apparatus of claim 1 wherein said minute pulse generator includes a source of potential and normally open minute pulse switch means connected between said source of potential and said polarity reversing means, said switch means being briefly closed once each minute by said master clock mechanism for coupling said source of potential and said polarity reversing means for generating a minute pulse.

5. The apparatus of claim 4 wherein said correction pulse generator includes switch means responsive to the arrival of said master minute indicator at said first arbitrary minute indication for intermittently coupling said potential source and said master output lines during said correction interval for producing said correction pulses.

6. The apparatus of claim 5 wherein said circuit means includes a diode poled to pass said reverse polarity pulses and block said first polarity pulses, and a switch connected in parallel with said diode, said switch opening in response to the arrival of said secondary minute indicator at said first arbitrary minute indication for blocking said first polarity pulses, and said polarity reversing means includes a relay having first and second contacts actuated in response to the reaching of said first arbitrary minute indication by said master minute indicator, said relay controlling said first and second contacts for reversing the connection between said minute pulse generator and said master output lines.

7. The apparatus of claim 1 wherein said correction pulse generator includes means responsive to said master clock, for generating a second sequence of correction pulses for a third predetermined interval once each period corresponding to the capacity of said master clock, said third interval commencing at a second arbitrary time indication of said master clock; and wherein said circuit means further blocks pulses of said first polarity for a fourth interval including at least a portion of said third interval thereby enabling secondary display units not displaying a time within said fourth interval to rapidly advance to said second arbitrary time indication in response to said correction pulses while allowing secondary time display units displaying a time within said fourth interval to be unresponsive to correction pulses; and wherein said polarity reversing means includes means for reversing the polarity of said minute pulses during said fourth interval thereby enabling secondary time display units that are on time to be maintained on time.

8. The apparatus of claim 7 wherein said circuit means includes a diode poled to pass said reverse polarity pulses and block said first polarity pulses, and a switch connected in parallel with said diode, said switch being responsive to the arrival of said secondary minute indicator at said first arbitrary minute indication for opening to block said first polarity pulses.

9. The apparatus of claim 7 wherein said polarity reversing means includes a relay having first and second contacts, said relay controlling said first and second contacts for reversing the connection between said minute pulse generator and said master output lines when said polarity reversing means is operative.

10. The apparatus of claim 7 wherein said minute pulse generator includes a source of potential and normally open minute pulse switch means connected between said source of potential and said polarity reversing means, said switch means being briefly closed once each minute by said master clock mechanism for coupling said source of potential and said polarity reversing means for generating a minute pulse.

11. The apparatus of claim 10 wherein said correction pulse generator includes a switch means for intermittently coupling said potential source and said master output lines during said first and third intervals for producing said correction pulses during said first and third correction intervals.

12. The apparatus of claim 11 wherein said circuit means includes a diode poled to pass said reverse polarity pulses and block said first polarity pulses, and a switch connected in parallel with said diode, said switch being responsive to the arrival of said secondary minute indicator at said second arbitrary minute indication of opening to block said first polarity pulses, and wherein said polarity reversing means includes a relay having first and second contacts, said relay controlling said first and second contacts for reversing the connection between said minute pulse generator and said master output lines when said polarity reversing means is operative.

13. The apparatus of claim 1 wherein said polarity reversing means includes means connected between said minute pulse generator and said master output lines for reversing the polarity of the minute pulse next succeeding the minute pulse coinciding with the arrival of said master minute indicator at said first arbitrary minute indication, and wherein the circuit means includes means for terminating the blocking of pulses of said first polarity when the secondary minute indicator advances one minute beyond said first arbitrary minute indication.

14. The apparatus of claim 6 wherein said predetermined number of pulses is one.

15. In a clock system including a secondary time display unit having a secondary mechanism responsive to pulses for incrementing the secondary minute and hour indicator, and also including a master clock having a master clock mechanism for advancing the master minute and hour indicator to provide an indication of the proper time, a self-correcting apparatus comprising:

a pair of master output lines;

a correction pulse generator responsive to said master clock mechanism for generating and coupling to said master output lines a sequence of correction pulses of first polarity during a predetermined correction interval of each hour, said hourly correction interval commencing when said master minute indicator reaches a first predetermined arbitrary minute indication, said correction pulses having a repetition rate at least sufficient to increment said secondary minute indicator at the rate of approximately sixty increments per minute;

a minute pulse generator responsive to said master clock for generating minute pulses of a reverse polarity for a predetermined number of minutes next succeeding the minute pulse which coincides with the arrival of said master minute indicator at said first arbitary minute indication and for generating minute pulses of said first polarity at other times;

circuit means interconnecting said secondary mechanism and said master output lines for blocking pulses of said first polarity and passing pulses of said reverse polarity for a second interval beginning when the secondary minute indicator reaches said first predetermined arbitrary minute indication and terminating when said secondary minute indicator advances the number of minutes corresponding to said predetermined number of minute pulses, thereby enabling a fast secondary time display unit to be unresponsive to correction and minute pulses of said first polarity upon reaching said first arbitary time indication and be delayed until said secondary minute indicator is synchronized with said master minute indicator while enabling the minute indicator of a slow secondary minute display unit to rapidly advance to said first arbitrary time indication in response to said correction pulses for becoming synchronized with said master minute indicator.

References Cited

UNITED STATES PATENTS 3,011,078 11/1961 Reynolds ------------- 58—34

RICHARD B. WILKINSON, Primary Examiner

EDITH C. SIMMONS, Assistant Examiner

U.S. Cl. X.R.

58—24

PO-1050
(5/69)

UNITED STATES PATENT OFFICE
CERTIFICATE OF CORRECTION

Patent No. 3469390 Dated September 30, 1969

Inventor(s) Ernest B. Zimmer

It is certified that error appears in the above-identified patent and that said Letters Patent are hereby corrected as shown below:

Column 21, line 32 (Claim 12) delete "of" and insert --for---.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents